United States Patent
Miettinen et al.

(10) Patent No.: US 7,469,126 B2
(45) Date of Patent: Dec. 23, 2008

(54) USAGE MODIFICATION OF RFID TRANSPONDER

(75) Inventors: Jarkko Miettinen, Tampere (FI); Marko Hanhikorpi, Tampere (FI)

(73) Assignee: UPM Raflatac Oy (FI)

( * ) Notice: Subject to any disclaimer, the term of this patent is extended or adjusted under 35 U.S.C. 154(b) by 394 days.

(21) Appl. No.: 10/889,458

(22) Filed: Jul. 12, 2004

(65) Prior Publication Data

US 2005/0068180 A1  Mar. 31, 2005

Related U.S. Application Data

(60) Provisional application No. 60/486,140, filed on Jul. 10, 2003.

(51) Int. Cl.
*H04B 5/00* (2006.01)
*G08B 13/14* (2006.01)

(52) U.S. Cl. ............. 455/41.1; 455/41.2; 340/571; 340/572.1; 340/572.2

(58) Field of Classification Search ............... 455/41.1; 340/571, 572.1–572.7
See application file for complete search history.

(56) References Cited

U.S. PATENT DOCUMENTS

| | | | |
|---|---|---|---|
| 4,021,705 A * | 5/1977 | Lichtblau | 361/765 |
| 5,508,684 A * | 4/1996 | Becker | 340/572.5 |
| 6,121,880 A | 9/2000 | Hughes et al. | |
| 7,042,357 B2 * | 5/2006 | Girvin et al. | 340/568.2 |
| 7,049,962 B2 * | 5/2006 | Atherton et al. | 340/572.1 |
| 7,081,815 B2 * | 7/2006 | Runyon et al. | 340/541 |
| 7,102,522 B2 * | 9/2006 | Kuhns | 340/572.7 |
| 7,316,358 B2 * | 1/2008 | Kotik et al. | 235/492 |
| 2007/0029384 A1 * | 2/2007 | Atherton | 235/435 |

FOREIGN PATENT DOCUMENTS

| | | |
|---|---|---|
| WO | WO 01/71848 | 9/2001 |
| WO | WO 02/077939 | * 10/2002 |

* cited by examiner

*Primary Examiner*—Duc M Nguyen
(74) *Attorney, Agent, or Firm*—Fitch, Even, Tabin & Flannery

(57) ABSTRACT

An RFID transponder is disclosed in which predetermined conductive portions will be removed from the transponder should the transponder be removed from a first object to which it is attached. The transponder has a first response to applied RF before the predetermined portions are removed and a second response after such removal. An RF detector can be used to scan objects with transponders to detect the first or the second response and thereby determine when a transponder has been moved.

18 Claims, 2 Drawing Sheets

USAGE MODIFICATION OF RFID TRANSPONDER

This application claims the benefit of U.S. Provisional Application No. 60/486,140 filed Jul. 10, 2003 which is hereby incorporated by reference herein.

FIELD OF THE INVENTION

The invention describes a method of affecting electrical performance (i.e. resonance frequency, impedance characteristics, Q-value) of an RFID (Radio Frequency Identification) transponder by mechanically removing a conductor or part of the conductor material when the transponder is removed from an object where it is attached.

BACKGROUND

Organizations such as lending libraries make recorded media such as CDs and DVDs available to their patrons and then re-stock the media when it is returned. The act of accepting and re-stocking the media may be as simple as placing a container containing the media back on the shelf or it may be as complicated as reading (playing a music CD for example) the media to make certain that it is proper. As a compromise, for the sake of efficiency, lending libraries have placed adhesive RFID labels on the media being loaned and read the label through the container to make sure that the appropriate media is in the container before re-stocking. Equivalent problems and solutions are used for the sellers of recorded media who accept returns of their products for refund.

It has been discovered that some library patrons or returning customers make copies of the recorded media and return the copy to the library or seller. Some people have even been known to return an un-recorded CD or DVD in hopes of keeping the original without the inconvenience of providing a copy for subsequent borrowers or purchasers. Those people who attempt to keep the original recorded media have even learned to remove RFID labels from the original CD or DVD and re-adhere them to the blank or copy they are returning; thus, thwarting the RFID label reading of returned media. That is, when a returned blank CD has been modified to include the original RFID label, an RFID scan will detect the blank as an original and the library or seller will be harmed. Thus, a problem exists to produce a system for loaned or exchanged goods which can efficiently determine whether returned items are the originals.

SUMMARY

In accordance with the invention, an RFID transponder with pressure sensitive adhesive compound is attached to any object that is suitable for adhering with the adhesive material being used. A strong adhesion between the RFID transponder and the object is required. When the RFID-transponder is removed from the object, a portion of the transponder remains with the object and the RFID transponder is changed to exhibit new RF characteristics which can be detected by RF scanning.

DETAILED DESCRIPTION

In accordance with an embodiment of the present method and apparatus a multilayer label or identifier is produced which exhibits a first response when scanned by RF energy before the label is removed from a first placement and which exhibits a second response after the label has been removed from its first placement. A scanner/detector can then be used to look for the first response from items having the label and, when not detected, look for the second response to discover if the label has been moved to another item. Although the present method and apparatus may find particular use by lending libraries and return accepting retailers, it is also useful in any environment where an RFID label may be improperly moved from one object to another.

Figure 3:
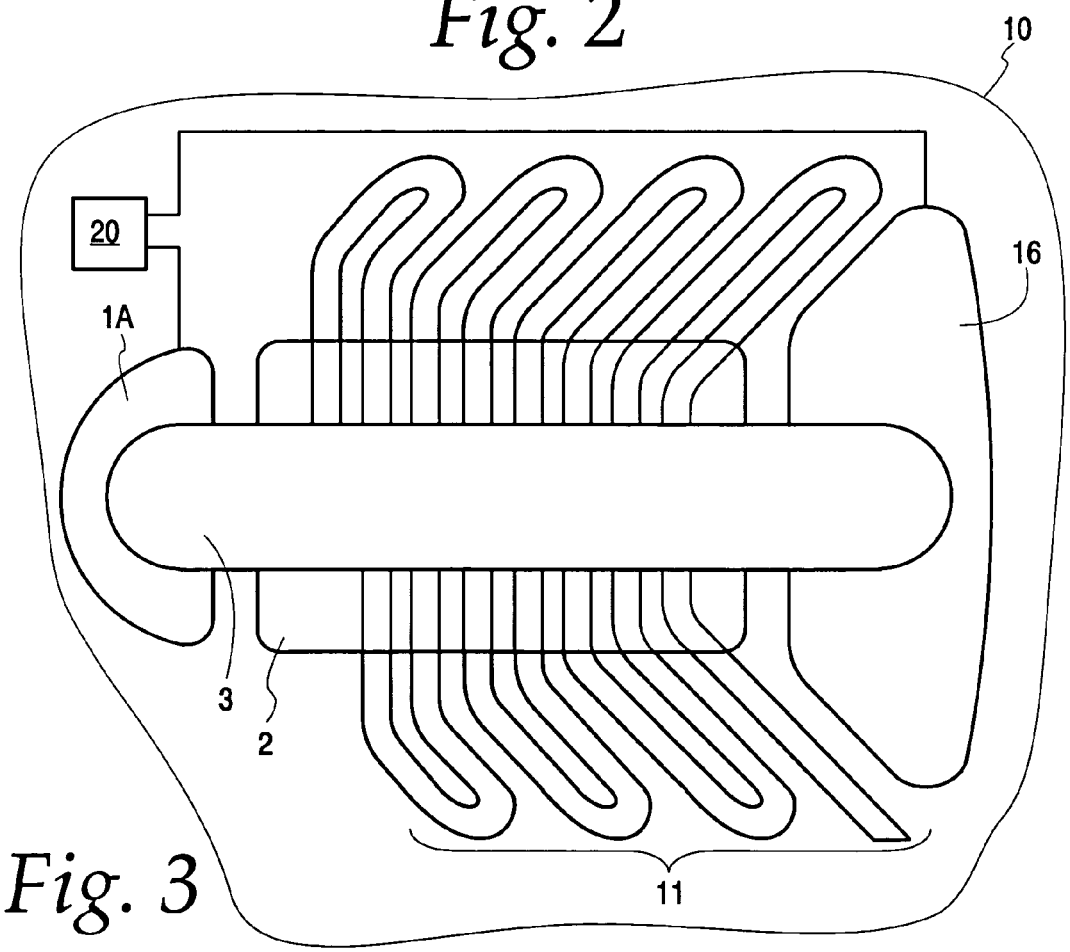
FIG. 3 shows construction of the printed silver paste bridge over the conductor lines.

FIG. 3 shows an RFID antenna which, along with an optional microchip, may be fabricated on a substrate, such as a paper or plastic label. The exact layout of the antenna is not described in detail herein as such is not needed for an understanding of the present invention. The irregular shape 10 represents the substrate which may be plastic, paper or other suitable label material. A first 12 layer of conductive material is then printed or adhered on the substrate in a manner which provides substantial adhesion. The first layer comprises portions of a conductive coil 11 which form an RFID antenna which is optionally connected to a microchip 20. Also in the first layer are conductor pads 1(a) and 1(b) which are connected to microchip 20. Next, a dielectric layer 2 may be strongly or weakly adhered to the coil/substrate layer. Over the dielectric layer 2, a conductive path 3 is next formed to ohmically connect the conductive pads 1(a) and 1(b) and to capacitively couple the conductors of coil 11. The conductive path 3 is weakly adhered to the dielectric 2 and pads 1(a) and 1(b). Lastly, an adhesive layer (4 FIG. 1) is placed on the label atop the conductive path 3 which strongly adheres to the conductive path 3 and provides strong adhesion when the label is affixed to an object such as a CD or DVD.

The structure of FIG. 3 is an RFID label antenna having first response characteristics when exposed to an external RF signal. The conductive path 3 is in electrical communication with and interacts with the coil 11 to produce an RFID transponder which provides the first response to an RFID scanner. For example, the antenna, when both the conductive coil portion 11 and the conductive path 3 are present may resonate at 19 MHZ and have a relatively narrow bandwidth and Q through which self oscillation occurs. In the present embodiment the conductive path 3 is ohmically connected to pads 1(a) and 1(b) and is capacitively coupled to coil 11. In other embodiments, the conductive path 3 which is only weakly adhered to the substrate may be ohmically, capacitively or inductively coupled to the conductive portion e.g., coil 11 which is strongly adhered to the substrate, depending on the electrical requirements of the RFID transponder.

Figure 1:
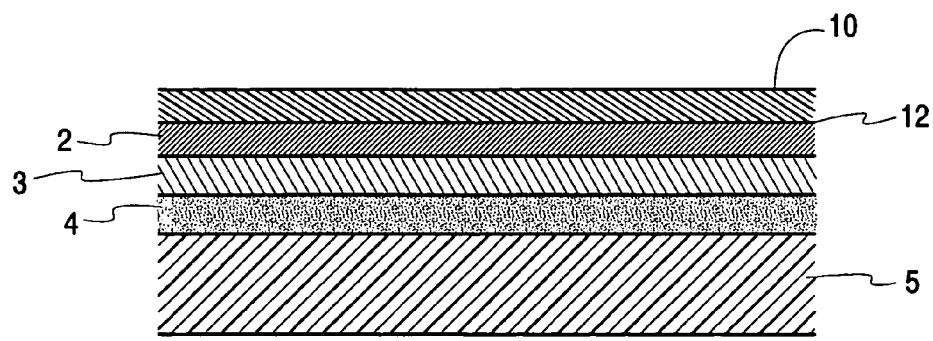
FIG. 1 shows the layer structure of an operational RFID transponder.

FIG. 1 shows the layers used to fabricate an RFID label of the type discussed above. The top most layer is the substrate 10. The second layer 12 is the layer of conductive paths making up coil 11, pads 1(a) and 1(b) and microchip 20. The conductive elements of layer 12 may be printed material such as silver paste or they may be conductive foil which is adhered to the substrate 10. It should be remembered that the bonding between layer 12 and 10 should be relatively strong. The next layer 2 represents the dielectric 2 over which conductive path 3 is placed. Again, conductive path 3 is relatively weakly adhered to any layer above it in FIG. 1. Layer 4 is an adhesive layer which strongly adheres to conductive path 3 and also to an object such as CD 5. While the label remains sandwiched as shown in FIG. 1 the conductive portions 11 and 3 electrically interact to form an RF antenna providing a first known response to RF energy.

Figure 2:
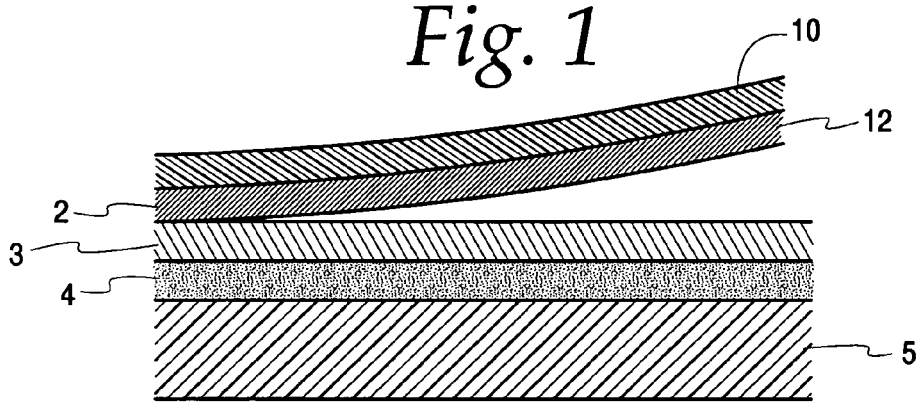
FIG. 2 illustrates breaking the conductive part of the RFID transponder.

FIG. 2 represents the label during the process of removal from the object 5. As the substrate 10 is raised the coil 11, pads 1(a) and 1(b) and microchip 20 which form layer 12 are removed with the substrate. This leaves the conductive portion 3 and the adhesive layer 4 still attached to the object 5. After removal, the coil 11 and optional microchip 20 remain on the substrate and can be detected by RF energy at or about the resonance of the coil 11 without conductive path 3.

Figure 4:
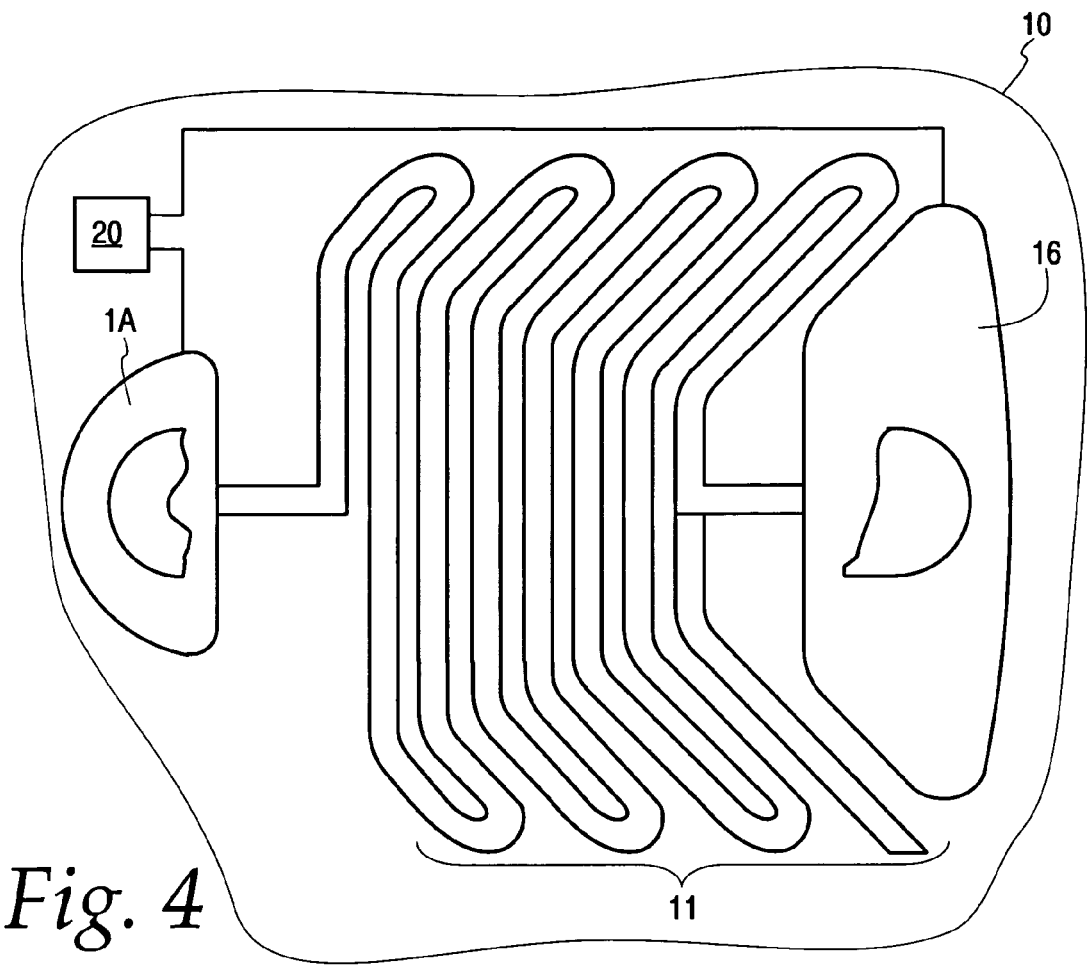
FIG. 4 shows a label with a modified RFID transponder.

FIG. 4 shows the portions of the RFID transponder remaining on the substrate 10 after its removal from the first object to which it was adhered. The altered transponder will have known RF characteristics which are different from the transponder of FIG. 3. Should someone adhere the modified (FIG. 4) label to a fraudulent product, such can be detected by an appropriate scanner. As mentioned above, the FIG. 3 transponder may exhibit a resonance at about 19 MHZ and have a narrow excitable range. By design the modified transponder (FIG. 4) may exhibit resonance at about 16 MHZ and a relatively broader excitability range.

A detector for such a label will first search for resonance at 19 MHZ expecting an intact label, and if that is not found, search for resonance at 16 MH to detect a modified label. Should a modified label be detected, the object e.g., a DVD, can be inspected for authenticity.

Figure 5:
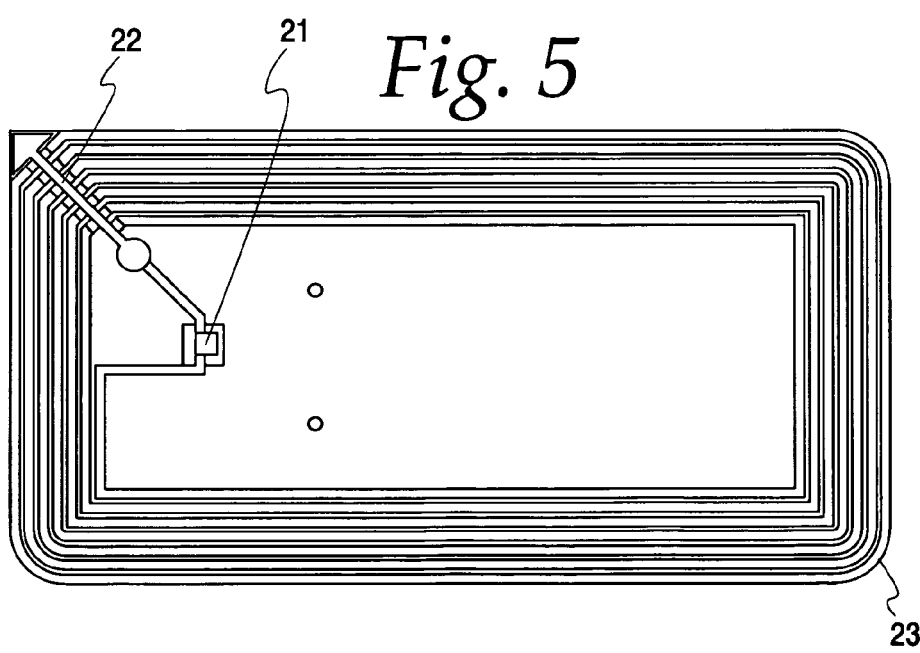
FIG. 5 shows an alternative antenna shape.

FIG. 5 shows an alternative antenna form which can be constructed and used as above described with regard to FIGS. 1-4. In FIG. 5, a microchip 21 is connected to a generally rectangular loop RF planar antenna 23. Also included is a conductive portion 22 which is placed over the antenna coil 23. As before, the relative adhesive strengths result in conductive portion 22 being removed if a label including the circuit of FIG. 5 is removed from the object. By design the RF response of the circuit of FIG. 5 is different when conductive portion 22 is present than when it is missing. The difference of RF response may thus be used to detect a removed and replaced label.

The substrate 10 used as the carrier of the RFID transponder's conductor, silk-screen printed silver paste and adhesive may be a thin film of polyethylene (PET) or polyimide (PI). Polyolefins may also be used. The substrate layer should not be too thick or unbending to decrease the even peeling effect to the adhesive.

The permanent conductive part of RFID transponder such as coil 11 and pads 1(a) and 1(b) may consist of thin copper or aluminum films held by adhesive to the substrate. Also screen printed silver paste can be used. A non-conductive silk screen printed dielectrical material 2 is processed between the permanent and non-permanent conductive parts. The dielectric material creates insulation between the conductor lines of the coil and the silk-screen printed silver paste bridge 3.

The non-permanent conductive part of the RFID transponder such as conductive path 3 is silk-screen printed silver paste. It is disabled when the RFID transponder is removed from the object. The paste should obtain higher tacking force to the applied adhesive 4 than to the permanent parts of the RFID transponder. Suitable silver paste material used in an application is, for example, 5029 DuPont silver paste. Other types can be used also.

The thickness and form of the silver paste antenna such as conductive path 3 preferably should be printed so that it creates a pattern that reliably adheres to the adhesive 4 and remains to the object with the adhesive. Bridge line width has to be sufficiently narrow, about 1 mm, so that deactivation is reliable.

The adhesives used in this application may be any commercially availably adhesives which can adhere to any object with such tacking strength that it alters the transponder by breaking the conductive part (printed silver paste) of the RFID transponder. Most usable adhesive type normally is PSA type. Minium required tacking strength should be 15N (FTM 9) or more.

The invention claimed is:

1. An identifier for attachment to an object, comprising:
a substrate having an electrically conductive coil which forms an antenna of an RFID transponder adhered thereto by a first strength of adhesion;
an electrically conductive path disposed in proximity to and in reactive electrical communication with the electrically conductive coil; and
an adhesive layer for adhering the conductive path to an object such that when the identifier is removed from the object the electrically conductive coil remains adhered to the substrate and a portion of the conductive path remains adhered to the object to interrupt the reactive electrical communication between the electrically conductive coil and the conductive path, the identifier exhibiting a first response to radio frequency signals when the conductive coil is in reactive electrical communication with the conductive path and exhibiting a second response, different from the first response when the reactive electrical communication is interrupted.

2. The identifier according to claim 1 wherein the first response is resonance at a first predetermined range of frequencies and the second response is resonance at a second range of frequencies different from the first range.

3. The identifier according to claim 2 wherein the reactive electrical communication comprises a capacitive connection.

4. The identifier according to claim 2 wherein the reactive electrical communication comprises an inductive connection.

5. The identifier according to claim 1 wherein the first response and the second response exhibit a different Q.

6. The identifier according to claim 1 wherein the reactive electrical communication between the conductive coil and the conductive path includes an ohmic connection.

7. The identifier according to claim 1 further comprising an intermediate adhesive between the conductive coil and the conductive path.

8. The identifier according to claim 7 wherein the adherence of the intermediate adhesive between the conductive coil and the conductive path is less than the adherence of the conductive coil and the substrate.

9. The identifier according to claim 8 wherein the adherence of the intermediate adhesive between the conductive coil and the conductive path is less than the adherence of the conductive path to the object.

10. The identifier according to claim 1 wherein the object is a compact disk.

11. The identifier according to claim 1 wherein the object is a DVD.

12. The identifier according to claim 1 comprising a dielectric layer between the electrically conductive coil and the electrically conductive path.

13. An apparatus for detecting an identifier of claim 1 which has been removed from an object, the apparatus including a device which provides an RF signal and exposes the identifier to radio frequency energy and an RFID scanner which detects the second response.

14. The apparatus for detecting an identifier of claim 13 which has been removed from an object and detecting a Q exhibited by the identifier.

15. An identifier for attachment to an object, comprising:
a substrate having an electrically conductive coil which forms an antenna of an RFID transponder adhered thereto by a first strength of adhesion;
an electrically conductive path disposed in proximity to and in reactive electrical communication with the electrically conductive coil, the reactive electrical communication selected from the group consisting of a capacitive connection and an inductive connection; and
an adhesive layer for adhering the conductive path to an object such that when the identifier is removed from the object the electrically conductive coil remains adhered to the substrate and a portion of the conductive path remains adhered to the object to interrupt the reactive electrical communication between the electrically conductive coil and the conductive path, the identifier exhibiting a first response to radio frequency signals when the conductive coil is in reactive electrical communication with the conductive path and exhibiting a second response, different from the first response when the reactive electrical communication is interrupted.

16. The identifier according to claim 15 wherein the first response is resonance at a first predetermined range of frequencies and the second response is resonance at a second range of frequencies different from the first range.

17. The identifier according to claim 16 further comprising an intermediate adhesive between the electrically conductive coil and the conductive path.

18. The identifier according to claim 17 wherein the adherence of the intermediate adhesive between the electrically conductive coil and the conductive path is less than the adherence of the electrically conductive coil and the substrate.

* * * * *